United States Patent
Akita et al.

(10) Patent No.: US 10,850,344 B2
(45) Date of Patent: Dec. 1, 2020

(54) ROBOT

(71) Applicant: Fanuc Corporation, Yamanashi (JP)

(72) Inventors: Daisuke Akita, Yamanashi (JP);
Masaaki Uematsu, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 128 days.

(21) Appl. No.: 16/127,778

(22) Filed: Sep. 11, 2018

(65) Prior Publication Data
US 2019/0143440 A1 May 16, 2019

(30) Foreign Application Priority Data
Nov. 10, 2017 (JP) ................................. 2017-216982

(51) Int. Cl.
| | |
|---|---|
| *B08B 3/02* | (2006.01) |
| *B08B 7/02* | (2006.01) |
| *B08B 7/04* | (2006.01) |
| *B23K 9/32* | (2006.01) |
| *G05B 19/418* | (2006.01) |

(52) U.S. Cl.
CPC ............... *B23K 9/328* (2013.01); *B08B 3/02* (2013.01); *B08B 7/02* (2013.01); *G05B 19/418* (2013.01); *B08B 7/04* (2013.01); *G05B 2219/37032* (2013.01); *G05B 2219/37351* (2013.01); *G05B 2219/40562* (2013.01); *G05B 2219/45078* (2013.01)

(58) Field of Classification Search
CPC .... B08B 3/02; B08B 7/02; B08B 7/04; B23K 9/328; G05B 19/418; G05B 2219/37032; G05B 2219/37351; G05B 2219/40562; G05B 2219/45078

USPC .......................................... 134/198; 277/500
See application file for complete search history.

(56) References Cited

U.S. PATENT DOCUMENTS

| | | |
|---|---|---|
| 4,609,804 A | 9/1986 | Kishi et al. |
| 2015/0321362 A1 | 11/2015 | Nakanishi |
| 2016/0184947 A1 | 6/2016 | Itou |
| 2016/0339553 A1 | 11/2016 | Nakazawa |
| 2017/0087719 A1 | 3/2017 | Tsuchiya |

FOREIGN PATENT DOCUMENTS

| | | |
|---|---|---|
| CN | 105729228 A | 7/2016 |
| CN | 105729496 A | 7/2016 |
| CN | 106113089 A | 11/2016 |
| CN | 106239532 A | 12/2016 |
| CN | 106737858 A | 5/2017 |
| CN | 206229751 U | 6/2017 |
| CN | 107081739 A | 8/2017 |
| CN | 107243891 A | 10/2017 |
| EP | 2149435 A1 | 2/2010 |

(Continued)

OTHER PUBLICATIONS

Matsuda, Nagachika; Notice of Reasons for Refusal for Japanese Application No. 2017-216982; dated Aug. 20, 2019; 3 pages.

(Continued)

*Primary Examiner* — Levon J Shahinian
(74) *Attorney, Agent, or Firm* — Shackelford, Bowen, McKinley & Norton, LLP

(57) ABSTRACT

A robot includes: a robot body including a plurality of joints, and a cleaning mechanism provided to the robot body and configured to clean a predetermined cleaning target site of the robot body to which a foreign material is likely to adhere.

4 Claims, 5 Drawing Sheets

(56) References Cited

FOREIGN PATENT DOCUMENTS

| | | |
|---|---|---|
| JP | H07-40054 A | 2/1995 |
| JP | 2002-160062 A | 6/2002 |
| JP | 2005-066808 A | 3/2005 |
| JP | 2005-319351 A | 11/2005 |
| JP | 2006-122919 A | 5/2006 |
| JP | 2007-253275 A | 10/2007 |
| JP | 2007-301660 A | 11/2007 |
| JP | 2008-119811 A | 5/2008 |
| JP | 2008-302446 A | 12/2008 |
| JP | 2016-215343 A | 12/2016 |
| JP | 2017-061001 A | 3/2017 |
| WO | WO-2014087615 A1 | 6/2014 |

OTHER PUBLICATIONS

Industrial Property Cooperation Center; Search Report by Registered Search Organization; submitted to the Japanese Patent Office dated Aug. 13, 2019; 9 pages.

Matsuda, Nagachika; Decision to Grant a Patent; Japanese Patent Application No. 2017-216982; dated Dec. 17, 2019; 3 pages.

The State Intellectual Property Office of the People's Republic of China; First Office Action for Chinese Patent Application No. 201811267558.0; dated Mar. 31, 2020; 8 pages.

ROBOT

CROSS-REFERENCE TO RELATED APPLICATIONS

This application is based on and claims priority to Japanese Patent Application No. 2017-216982 filed on Nov. 10, 2017, the content of which is incorporated herein by reference in its entirety.

TECHNICAL FIELD

The present invention relates to an industrial robot having a self-cleaning function.

BACKGROUND ART

Conventionally known devices clean a welding torch held by a welding robot by removing a spatter adhering to the welding torch (refer to PTLs 1 and 2, for example).

Other known devices clean a press machining mold by removing a foreign material adhering to the mold (refer to PTL 3, for example).

CITATION LIST

Patent Literature

{PTL 1}
Japanese Unexamined Patent Application, Publication No. 2006-122919
{PTL 2}
Japanese Unexamined Patent Application, Publication No. Hei 7-40054
{PTL 3}
Japanese Unexamined Patent Application, Publication No. 2005-319351

SUMMARY OF INVENTION

A robot according to an aspect of the present disclosure includes: a robot body including a plurality of joints; a cleaning mechanism provided to the robot body and configured to clean a predetermined cleaning target site of the robot body to which a foreign material is likely to adhere.

DESCRIPTION OF EMBODIMENTS

A robot according to an embodiment of the present invention will be described below with reference to the accompanying drawings.

Figure 1:
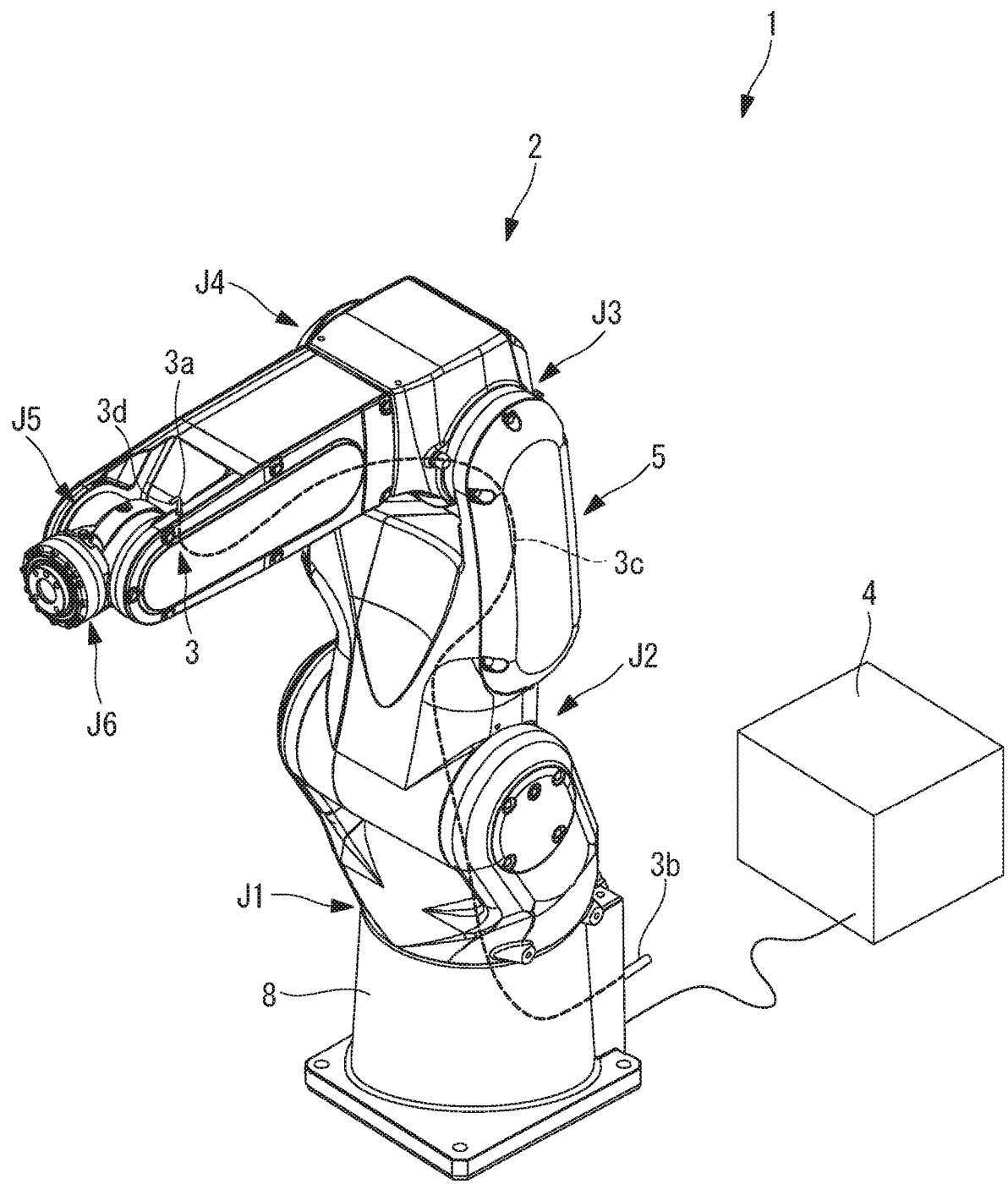
FIG. 1 is a perspective view illustrating the entire configuration of a robot according to an embodiment of the present invention.

A robot 1 according to the present embodiment is an industrial robot, and is, for example, a machining robot configured to perform machining such as welding. As illustrated in FIG. 1, the robot 1 includes a robot body 2, a cleaning mechanism 3 provided to the robot body 2 and configured to clean the robot body 2, and a controller 4 connected with the robot body 2 and the cleaning mechanism 3 and configured to control the robot body 2 and the cleaning mechanism 3.

The robot body 2 includes an arm 5 including a plurality of joints J1 to J6, and an end effector 6 (refer to FIGS. 5 and 6) detachably provided to the tip of the arm 5. The drawings to be referred illustrate a six-axis articulated robot as an example of the robot body 2, but another kind of robot may be employed.

Figure 2:
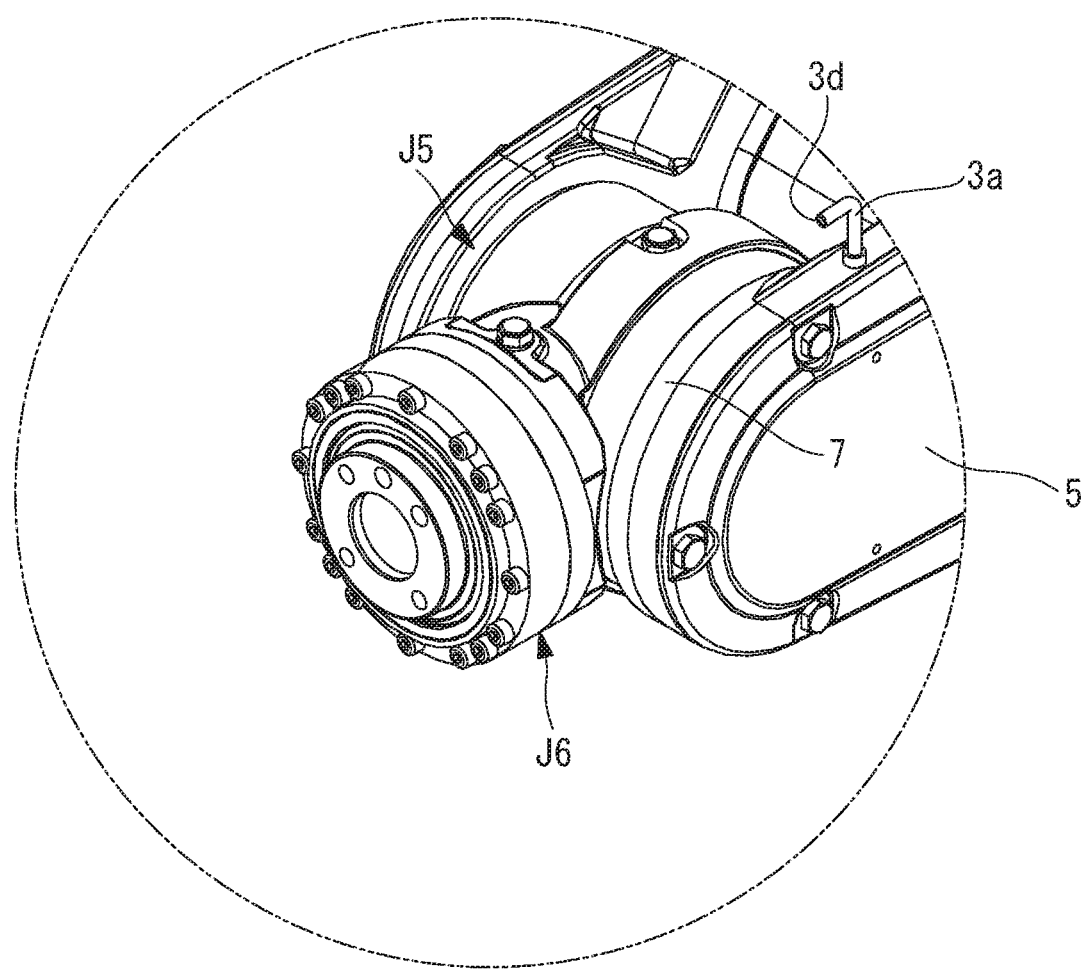
FIG. 2 is an enlarged view of a tip part of an arm of the robot in FIG. 1.

As illustrated in FIG. 2, the joints J1 to J6 are each provided with a reducer, and an oil seal 7 for preventing oil leakage from the reducer.

The end effector 6 is, for example, a hand configured to hold a machining device such as a welding torch.

The cleaning mechanism 3 includes a nozzle 3a attached near a predetermined cleaning target site of the robot body 2, a supply inlet 3b, and a pipe 3c connecting the nozzle 3a and the supply inlet 3b through inside of the robot body 2.

The nozzle 3a includes an injection port 3d opened toward the cleaning target site.

The supply inlet 3b is preferably provided to an immovable part (for example, a base 8 supporting the arm 5) of the robot body 2.

The supply inlet 3b is connected with, through an external pipe (not illustrated), a fluid source (not illustrated) disposed outside of the robot body 2 and configured to supply cleaning fluid such as air or water. The cleaning fluid is supplied from the fluid source to the nozzle 3a through the supply inlet 3b and the pipe 3c, and then injected toward the cleaning target site through the injection port 3d. Start and stop of injection of the cleaning fluid from the injection port 3d are controlled by, for example, the controller 4 opening and closing a valve (not illustrated) provided between the supply inlet 3b and the injection port 3d.

The cleaning target site is a site that a foreign material is likely to adhere to and accumulate at, and particularly, is a site at which the foreign material causes failure of the robot body 2. Thus, the cleaning target site is selected in accordance with a task performed by the robot body 2, an environment in which the robot body 2 is installed, and the like.

For example, when the robot body 2 performs welding with a welding torch held by a hand 6, spatters such as metal powder generated through the welding are likely to adhere to the hand 6 and the arm 5. A spatter caught in the oil seal 7 at the arm 5 potentially causes degradation of sealing performance of the oil seal 7 and damage on the reducer or the like due to the degradation. Thus, the cleaning target site is selected to be the hand 6 and the oil seal 7.

When external equipment is mounted outside of the arm 5, an insulator for electrically insulating the external equipment from the arm 5 is attached to the outer surface of the arm 5. When a metal chip or the like accumulates at the insulator, the external equipment is potentially damaged through conduction with the arm 5. Thus, in such a case, the cleaning target site is selected to be the insulator.

FIG. 1 only illustrates the nozzle 3a for the oil seal 7 at the joint J5, but the nozzle 3a is provided for all the cleaning target sites.

The controller 4 includes a processor such as a central processing unit, and has a cleaning mode in which the processor actuates the cleaning mechanism 3 in accordance with a cleaning program set in advance. The controller 4 periodically executes the cleaning mode in accordance with a schedule set in advance. For example, the controller 4, on every day, executes the cleaning mode at a predetermined time or after the end of a task performed by the robot body 2. Alternatively, the controller 4 may execute the cleaning mode at an optional timing in accordance with a user instruction.

The following describes operation of the robot 1 configured as described above.

The robot 1 according to the present embodiment periodically executes the cleaning mode to clean the cleaning target site to which a foreign material is adhered through, for example, a task performed by the robot body 2. Specifically, in the cleaning mode, the controller 4 actuates the cleaning mechanism 3 to inject the cleaning fluid such as air or water from the injection port 3d of the nozzle 3a toward the cleaning target site. Accordingly, the foreign material adhering to the cleaning target site is blown off by the air or washed away by the water.

Accumulation of a foreign material at the cleaning target site and failure of the robot body 2 caused by the accumulation are prevented by periodically performing such cleaning of the cleaning target site.

When the cleaning target site is the oil seal 7 at each of the joints J1 to J6, the controller 4 may control the injection port 3d to inject the cleaning fluid while rotating the joints J1 to J6. The oil seal 7 is rotated through the rotation of each of the joints J1 to J6, and thus the cleaning fluid can be sprayed onto the entire circumference of the oil seal 7. Alternatively, a plurality of injection ports 3d may be provided and arranged in the circumferential direction of the oil seal 7 so that the cleaning fluid is sprayed onto the entire circumference of the oil seal 7.

As described above, according to the present embodiment, the robot body 2 is provided with the cleaning mechanism 3 configured to clean the robot body 2 itself, and the robot body 2 is periodically and automatically cleaned by the cleaning mechanism 3. With this configuration, it is unnecessary to perform, by human, cleaning of the robot body 2 and installation and maintenance of a cleaning instrument, and thus periodic cleaning of the robot body 2 can be performed easily and without cost.

In the present embodiment, the cleaning mechanism 3 injects the cleaning fluid toward the cleaning target site, but the cleaning target site may be vibrated instead.

Figure 3:
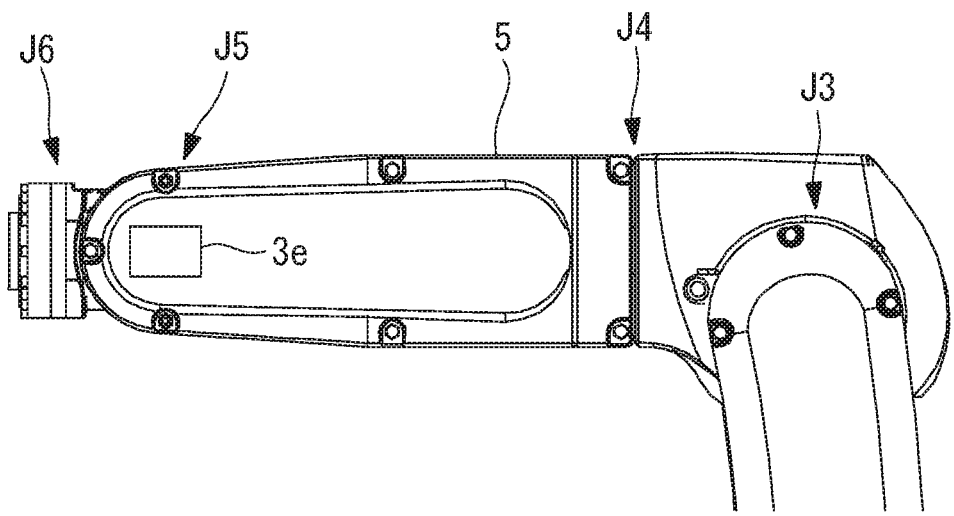
FIG. 3 is a diagram illustrating the tip part of the arm of the robot in FIG. 1 according to a modification.

For example, as illustrated in FIG. 3, the cleaning mechanism 3 includes a vibration generator 3e provided near the cleaning target site and configured to generate vibration at high speed (for example, 5 Hz or higher). The vibration generator 3e vibrates the cleaning target site at high speed to shake off a foreign material adhering to the cleaning target site. Such vibration cleaning is effective for removal of a dry foreign material such as a chip.

Figure 4:
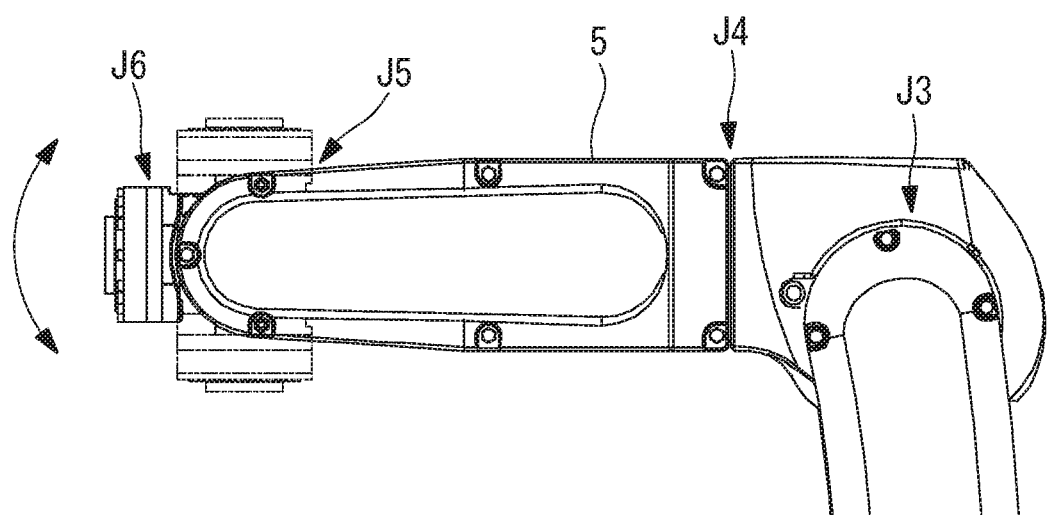
FIG. 4 is a diagram illustrating the tip part of the arm of the robot in FIG. 1 according to another modification.

As illustrated in FIG. 4, in place of the vibration generator 3e, the joints J1 to J6 may be used as the cleaning mechanism 3 and driven by the controller 4 to repeatedly reciprocate the joints J1 to J6 in small motions, thereby generating vibration. For example, the controller 4 controls each of the joints J1 to J6 to rotationally vibrate at high speed (for example, 5 Hz or higher) between +90° and −90°.

A foreign material is likely to adhere to a tip part of the arm 5 near the end effector 6. Thus, the rotational vibration of the joints J5 and J6 is effective for removal of a foreign material adhering to the tip part (for example, the joints J5 and J6) of the arm 5. FIG. 4 illustrates rotational vibration of the joint J5.

When a welding cable having a tip connected with a welding torch is wired along the arm 5 on the outside of the arm 5, a foreign material adheres also to the welding cable. To remove such a foreign material, it is effective to vibrate the entire arm 5 through rotational vibration of the joint J1 nearest to the base 8.

Figure 5:
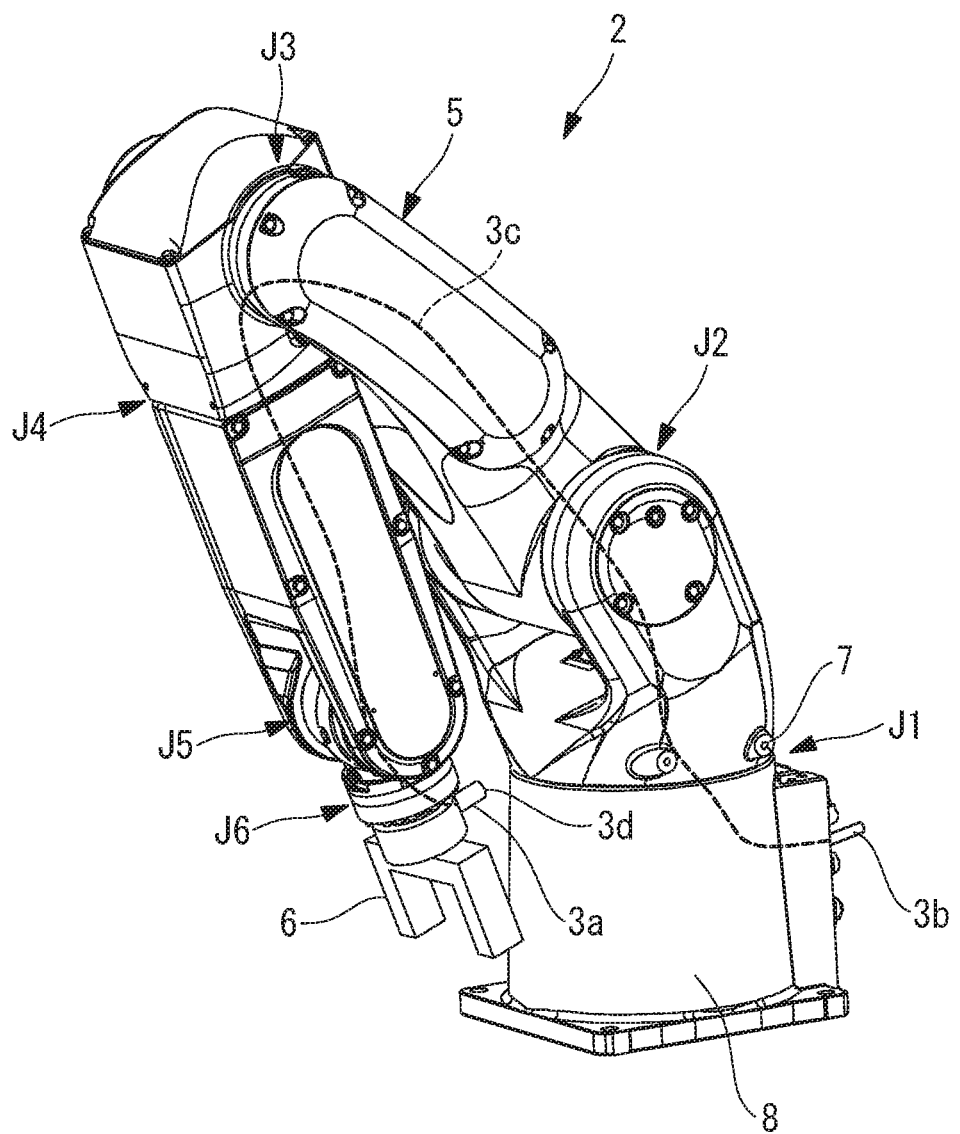
FIG. 5 is a configuration diagram of the robot in FIG. 1 according to another modification.

In the present embodiment, as illustrated in FIG. 5, the nozzle 3a may be provided to the tip part of the arm 5 or the end effector 6. The controller 4 may execute the cleaning mode in accordance with a schedule set in advance and control the robot body 2 in accordance with the cleaning program to operate the arm 5 so that the injection port 3d of the nozzle 3a points to the cleaning target site. In the example illustrated in FIG. 5, the arm 5 is operated so that the injection port 3d provided to the end effector 6 points to the oil seal 7 of the joint J1, and the cleaning fluid is injected from the injection port 3d while the joint J1 is rotated, thereby cleaning the oil seal 7 of the joint J1 over the entire circumference.

As described above, when the injection port 3d is provided to the tip part of the arm 5 or the end effector 6, which has a wide movable range, and the arm 5 is operated to move the injection port 3d relative to the robot body 2, a plurality of cleaning target sites of the robot body 2 can be cleaned by using the same injection port 3d.

Figure 6:
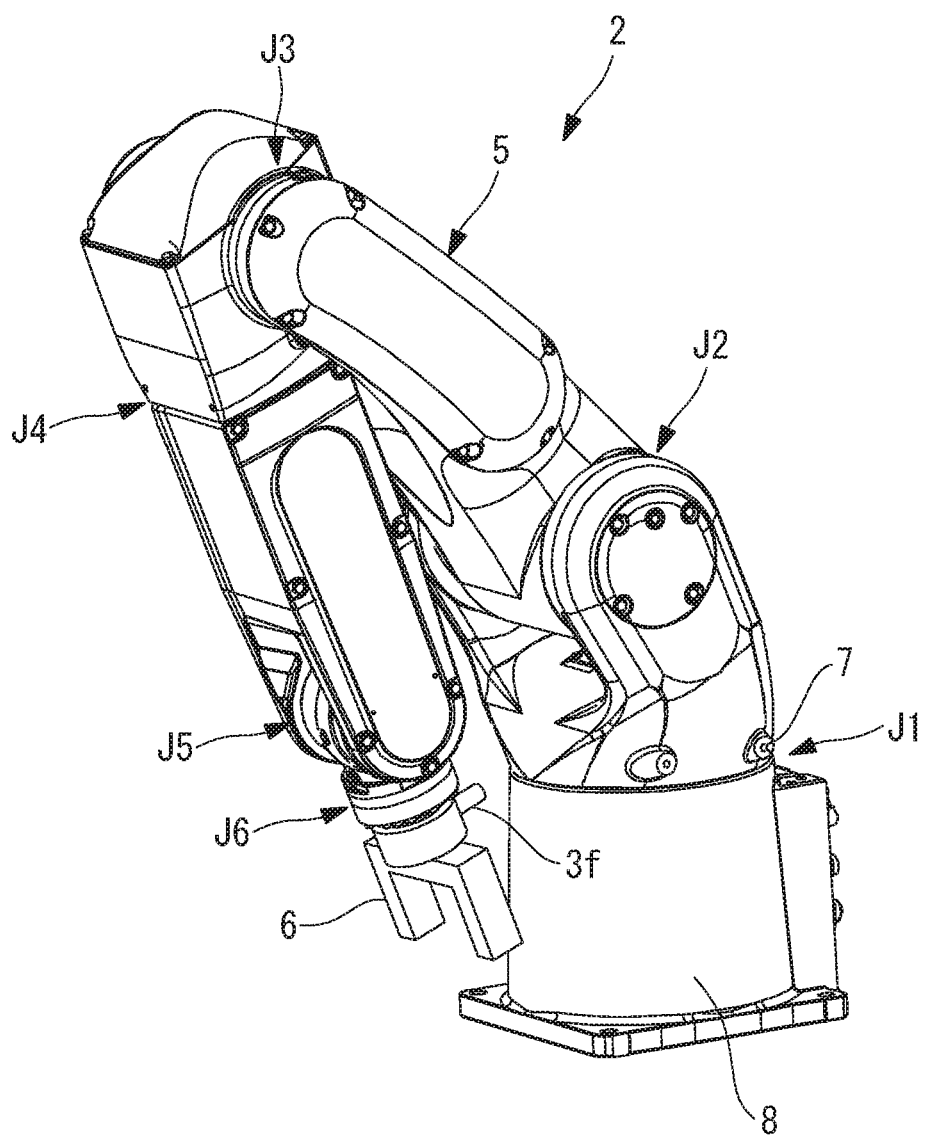
FIG. 6 is a configuration diagram of the robot in FIG. 1 according to another modification.

As illustrated in FIG. 6, in place of the injection port 3d, an electromagnet 3f may be provided to the tip part of the arm 5 or the end effector 6. In this case, the controller 4 operates the arm 5 so that the electromagnet 3f is disposed near a cleaning target site, and subsequently causes the electromagnet 3f to generate magnetic force. Accordingly, a foreign material such as a metal chip adhering to the cleaning target site is attracted to the electromagnet 3f and removed from the cleaning target site.

The nozzle 3a and the electromagnet 3f for cleaning the end effector 6 may be provided to the base 8 of the robot body 2. When the arm 5 is operated so that the end effector 6 is disposed near the nozzle 3a of the base 8 or the electromagnet 3f, a foreign material adhering to the end effector 6 can be removed by the cleaning fluid from the nozzle 3a or the magnetic force of the electromagnet 3f.

In the present embodiment, a sensor configured to detect a foreign material at a cleaning target site may be provided. The sensor is, for example, a visual sensor provided to the robot body 2 and configured to detect change in the color of the cleaning target site due to foreign material accumulation. When a foreign material is detected by the sensor, the controller 4 automatically executes the cleaning mode. Alternatively, a user may manually execute the cleaning mode based on a result of detection of a foreign material by the sensor.

When such a sensor is provided, it is possible to quickly detect adhesion of a foreign material to the cleaning target site and to remove the foreign material at an appropriate timing.

From the above-described embodiments, the following aspects of the present disclosure are derived.

A robot according to an aspect of the present disclosure includes: a robot body including a plurality of joints; a cleaning mechanism provided to the robot body and configured to clean a predetermined cleaning target site of the robot body to which a foreign material is likely to adhere.

According to the present aspect, the robot body is provided with the cleaning mechanism for cleaning the cleaning target site of the robot body itself. With this configuration, it is unnecessary to perform, by human, tasks such as cleaning of the robot body and installation and maintenance of a cleaning instrument, and thus periodic cleaning of the robot body can be performed easily and without cost.

In the above-described aspect, the cleaning mechanism may be configured to inject cleaning fluid toward the predetermined cleaning target site.

With this configuration, a foreign material adhering to the predetermined cleaning target site can be blown off or washed away by the cleaning fluid.

In the above-described aspect, the cleaning mechanism may include an injection port provided near the predetermined cleaning target site and configured to inject the cleaning fluid toward the predetermined cleaning target site.

When the injection port is provided for each cleaning target site in this manner, the cleaning fluid injected from the injection port can be reliably sprayed onto the cleaning target site, thereby reliably cleaning the cleaning target site.

In the above-described aspect, the robot may include a control unit configured to control the robot body, the cleaning mechanism may include an injection port provided to an end effector attached to a tip part of an arm of the robot body or a tip of the arm and configured to inject the cleaning fluid, and the control unit may control the robot body so that the injection port points to the predetermined cleaning target site.

When the injection port is movable through operation of the robot body in this manner, a plurality of cleaning target sites can be cleaned by using the same injection port.

In the above-described aspect, the cleaning mechanism may vibrate the predetermined cleaning target site.

With this configuration, a foreign material adhering to the predetermined cleaning target site can be shaken off by the vibration.

In the above-described aspect, the cleaning mechanism may include a vibration generator provided near the predetermined cleaning target site and configured to generate vibration.

The vibration generator can be provided at an optional position on the robot body, and thus the cleaning target site at an optional position on the robot body can be cleaned through vibration generated by the vibration generator.

In the above-described aspect, the robot may include a control unit configured to control the robot body, the cleaning mechanism may include a joint of an arm of the robot, and the control unit may control the robot body to vibrate the joint.

With this configuration, the joint and the vicinity thereof can be cleaned with vibration without additional equipment configured to generate vibration and provided to the robot body.

In the above-described aspect, the predetermined cleaning target site may be an oil seal provided to the joint.

Degradation of sealing performance of the oil seal due to a foreign material can be prevented by cleaning the oil seal.

In the above-described aspect, the robot may include a sensor configured to detect the adhesion of a foreign material to the predetermined cleaning target site.

With this configuration, the adhesion of a foreign material to the cleaning target site can be detected fast by the sensor, and thus the cleaning target site can be cleaned at an appropriate timing.

According to the aforementioned aspects, periodic cleaning of a robot body can be performed easily and without cost.

REFERENCE SIGNS LIST 1 robot
2 robot body
3 cleaning mechanism
3*a* nozzle (cleaning mechanism)
3*b* supply inlet (cleaning mechanism)
3*c* pipe (cleaning mechanism)
3*d* injection port (cleaning mechanism)
3*e* vibration generator (cleaning mechanism)
3*f* electromagnet (cleaning mechanism)
4 controller (control unit)
5 arm
6 end effector
7 oil seal
J1, J2, J3, J4, J5, J6 joint

The invention claimed is:

1. A robot comprising:
an arm having a plurality of joints;
a vertical articulated robot body including an arm having a plurality of joints and an end effector detachably attached to a tip of the arm;
a cleaning mechanism provided in the robot body and configured to clean a predetermined cleaning target site of the arm to which a foreign material is likely to adhere;
a control unit configured to control the robot body;
wherein the cleaning mechanism includes an injection port provided on the end effector attached to a tip part of the arm of the robot body or a tip of the arm and configured to inject the cleaning fluid; and
wherein the control unit comprises a central processing unit configured to execute an operating program for controlling the robot body so that the injection port points to at least one of the joints as the predetermined cleaning target site.

2. The robot according to claim 1, wherein the cleaning mechanism further includes an injection port provided near the predetermined cleaning target site and configured to inject the cleaning fluid toward the predetermined cleaning target site.

3. The robot according to claim 1, wherein the predetermined cleaning target site is an oil seal provided to the joint.

4. The robot according to claim 1, further comprising a sensor configured to detect the adhesion of the foreign material to the predetermined cleaning target site.

* * * * *